US010405228B2

(12) United States Patent
Liu et al.

(10) Patent No.: US 10,405,228 B2
(45) Date of Patent: Sep. 3, 2019

(54) SYSTEM INFORMATION BLOCK PROVIDING CELL ACCESS INFORMATION SUPPORTING WIDEBAND COVERAGE ENHANCEMENT IN WIRELESS COMMUNICATION NETWORKS

(71) Applicant: QUALCOMM Incorporated, San Diego, CA (US)

(72) Inventors: Chih-Hao Liu, San Diego, CA (US); Srinivas Yerramalli, San Diego, CA (US); Andrei Dragos Radulescu, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 15/892,183

(22) Filed: Feb. 8, 2018

(65) Prior Publication Data

US 2018/0359656 A1 Dec. 13, 2018

Related U.S. Application Data

(60) Provisional application No. 62/517,111, filed on Jun. 8, 2017.

(51) Int. Cl.
*H04W 28/02* (2009.01)
*H04W 72/04* (2009.01)
(Continued)

(52) U.S. Cl.
CPC ....... *H04W 28/0289* (2013.01); *H04L 5/0048* (2013.01); *H04W 24/02* (2013.01);
(Continued)

(58) Field of Classification Search
CPC ............... H04W 4/005; H04W 72/042; H04W 72/0453; H04W 74/0833; H04W 72/04;
(Continued)

(56) References Cited

U.S. PATENT DOCUMENTS

2011/0286549 A1* 11/2011 Hu .......................... G10L 21/00
375/295
2014/0098761 A1 4/2014 Lee et al.
(Continued)

FOREIGN PATENT DOCUMENTS

WO WO-2015116732 A1 8/2015
WO WO-2015143244 A1 9/2015

OTHER PUBLICATIONS

International Search Report and Written Opinion—PCT/US2018/027798—ISA/EPO—dated Jul. 6, 2018.

*Primary Examiner* — Jung Liu
(74) *Attorney, Agent, or Firm* — Norton Rose Fullbright

(57) ABSTRACT

Configurations of system information blocks providing cell access information supporting wideband coverage enhancement in wireless communication networks are disclosed. Embodiments encode and transmit information elements for both a legacy system information block and a wideband coverage enhancement system information block in a multiple subframe discovery reference signal configuration. For example, embodiments may utilize a two subframe CR-DRS configuration in which a WCE SIB-MF1 message payload is encoded and transmitted independently with respect to a legacy SIB-MF1 message payload. Additionally, or alternatively, embodiment may utilize a two subframe CR-DRS configuration in which both a legacy SIB-MF1 message payload and a WCE SIB-MF1 message payload share the same DRS subframe payload by jointly encoding the legacy SIB-MF1 and WCE SIB-MF1 messages.

30 Claims, 7 Drawing Sheets

(51) Int. Cl.
  *H04W 24/02* (2009.01)
  *H04W 48/16* (2009.01)
  *H04L 5/00* (2006.01)
  *H04W 48/12* (2009.01)

(52) U.S. Cl.
  CPC ........... *H04W 48/12* (2013.01); *H04W 48/16* (2013.01); *H04W 72/042* (2013.01); *H04W 72/0446* (2013.01)

(58) Field of Classification Search
  CPC ..... H04W 52/36; H04W 56/001; H04W 4/70; H04W 48/12; H04B 1/7143; H04B 1/713; H04L 5/14; H04L 5/0048
  See application file for complete search history.

(56) References Cited

U.S. PATENT DOCUMENTS

| | | | |
|---|---|---|---|
| 2015/0215910 A1 | 7/2015 | Han et al. | |
| 2016/0353440 A1* | 12/2016 | Lee | H04W 4/70 |
| 2017/0134881 A1* | 5/2017 | Oh | H04W 4/70 |

\* cited by examiner

US 10,405,228 B2

SYSTEM INFORMATION BLOCK PROVIDING CELL ACCESS INFORMATION SUPPORTING WIDEBAND COVERAGE ENHANCEMENT IN WIRELESS COMMUNICATION NETWORKS

CROSS-REFERENCE TO RELATED APPLICATIONS

This application claims the benefit of U.S. Provisional Patent Application No. 62/517,111, entitled, "SYSTEM INFORMATION BLOCK PROVIDING CELL ACCESS INFORMATION SUPPORTING WIDEBAND COVERAGE ENHANCEMENT IN WIRELESS COMMUNICATION NETWORKS," filed on Jun. 8, 2017, which is expressly incorporated by reference herein in its entirety as if fully set forth below and for all applicable purposes.

TECHNICAL FIELD

Aspects of the present disclosure relate generally to wireless communication networks, and more particularly, to configurations of system information blocks providing cell access information supporting wideband coverage enhancement in wireless communication networks using unlicensed spectrum. Certain embodiments of the technology discussed below encode and transmit information elements for both a legacy system information block and a wideband coverage enhancement system information block in a multiple subframe discovery reference signal configuration herein.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wideband coverage enhancement (WCE) in a wireless network is provided. For example, a method of embodiments can include determining (e.g., by controller logic of a base station operable in the wireless network) if a legacy system information block (SIB) message payload size is larger than a WCE SIB message payload size by a threshold amount, wherein the legacy SIB message payload may comprise system information to aid one or more UE operable in the wireless network implementing a non-wideband coverage enhancement communication mode and the WCE SIB message payload may comprise system information to aid one or more UE operable in the wireless network implementing a wideband coverage enhancement communication mode. The method of embodiments can include transmitting (e.g., using a transmit processor of the base station) a multiple subframe coverage enhancement (CE) discovery reference signal (DRS) having the legacy SIB message payload and the WCE SIB message payload independently encoded therein if the legacy SIB message payload size is larger than the WCE SIB message payload by the threshold amount. The method of embodiments can additionally or alternatively include transmitting (e.g., using a transmit processor of the base station) the multiple subframe CE DRS having the legacy SIB message payload and the WCE SIB message payload jointly encoded therein if the legacy SIB message payload size is not larger than the WCE SIB message payload by the threshold amount.

In an additional aspect of the disclosure, an apparatus configured for wideband coverage enhancement (WCE) in a wireless network is provided. For example, the apparatus of embodiments can include means for determining (e.g., by a base station operable in the wireless network) if a legacy system information block (SIB) message payload size is larger than a WCE SIB message payload size by a threshold amount, wherein the legacy SIB message payload may comprise system information to aid one or more UE operable in the wireless network implementing a non-wideband coverage enhancement communication mode and the WCE SIB message payload may comprise system information to aid one or more UE operable in the wireless network implementing a wideband coverage enhancement communication mode. The apparatus of embodiments can include means for transmitting (e.g., by the base station) a multiple subframe coverage enhancement (CE) discovery reference signal (DRS) having the legacy SIB message payload and the WCE SIB message payload independently encoded therein if the legacy SIB message payload size is larger than the WCE SIB message payload by the threshold amount. The apparatus of embodiments can additionally or alternatively include means for transmitting (e.g., by the base station) the multiple subframe CE DRS having the legacy SIB message payload and the WCE SIB message payload jointly encoded therein if the legacy SIB message payload size is not larger than the WCE SIB message payload by the threshold amount.

In an additional aspect of the disclosure, a non-transitory computer-readable medium having program code for wideband coverage enhancement (WCE) in a wireless network recorded thereon is provided. The program code of embodiments can include program code for determining (e.g., by a base station operable in the wireless network) if a legacy system information block (SIB) message payload size is larger than a WCE SIB message payload size by a threshold amount, wherein the legacy SIB message payload may comprise system information to aid one or more UE operable in the wireless network implementing a non-wideband coverage enhancement communication mode and the WCE SIB message payload may comprise system information to aid one or more UE operable in the wireless network implementing a wideband coverage enhancement communication mode. The program code of embodiments can include program code for transmitting (e.g., by the base station) a multiple subframe coverage enhancement (CE) discovery reference signal (DRS) having the legacy SIB message payload and the WCE SIB message payload independently encoded therein if the legacy SIB message payload size is larger than the WCE SIB message payload by the threshold amount. The program code of embodiments can additionally or alternatively include program code for transmitting (e.g., using a transmit processor of the base station) the multiple subframe CE DRS having the legacy SIB message payload and the WCE SIB message payload jointly encoded therein if the legacy SIB message payload size is not larger than the WCE SIB message payload by the threshold amount.

In an additional aspect of the disclosure, an apparatus configured for wideband coverage enhancement (WCE) in a wireless network is provided. The apparatus includes at least one processor, and a memory coupled to the processor. The at least one processor of embodiments can be configured to determine, by a base station operable in the wireless network, if a legacy system information block (SIB) message payload size is larger than a WCE SIB message payload size by a threshold amount, wherein the legacy SIB message payload comprises system information to aid one or more UE operable in the wireless network implementing a non-wideband coverage enhancement communication mode and the WCE SIB message payload comprises system information to aid one or more UE operable in the wireless network implementing a wideband coverage enhancement communication mode. The at least one processor of embodiments can be configured to transmit (e.g., by the base station) a multiple subframe coverage enhancement (CE) discovery reference signal (DRS) having the legacy SIB message payload and the WCE SIB message payload independently encoded therein if the legacy SIB message payload size is larger than the WCE SIB message payload by the threshold amount. The at least one processor of embodiments can additionally or alternatively be configured to transmit (e.g., by the base station) the multiple subframe CE DRS having the legacy SIB message payload and the WCE SIB message payload jointly encoded therein if the legacy SIB message payload size is not larger than the WCE SIB message payload by the threshold amount.

In one aspect of the disclosure, a method for wideband coverage enhancement (WCE) in a wireless network is provided. For example, a method of embodiments can include receiving (e.g., by a UE configured for WCE wireless communications in the wireless network) a multiple subframe coverage enhancement (CE) discovery reference signal (DRS) having both legacy system information block (SIB) message payload and WCE SIB message payload encoded therein, wherein the legacy SIB message payload comprises system information to aid one or more UE operable in the wireless network implementing a non-wideband coverage enhancement communication mode and the WCE SIB message payload comprises system information to aid one or more UE operable in the wireless network implementing a wideband coverage enhancement communication mode. The method of embodiments can include determining (e.g., by controller logic of the UE) if a location of one or more resources within the multiple subframe CE DRS indicates that the legacy SIB message payload and the WCE SIB message payload are independently encoded in the multiple subframe CE DRS or that the legacy SIB message payload and the WCE SIB message payload are jointly encoded in the multiple subframe CE DRS. The method of embodiments can include decoding (e.g., using a receive processor of the UE) the WCE SIB message payload for use by the UE in implementing the wideband coverage enhancement communication mode if it is determined that the location of the one or more resources within the multiple subframe CE DRS indicates that the legacy SIB message payload and the WCE SIB message payload are independently encoded in the multiple subframe CE DRS. The method of embodiments can additionally or alternatively include decoding (e.g., using a receive processor of the UE) the legacy SIB message payload and the WCE SIB message payload for use by the UE in implementing the wideband coverage enhancement communication mode if it is determined that the location of the one or more resources within the multiple subframe CE DRS indicates that the legacy SIB message payload and the WCE SIB message payload are jointly encoded in the multiple subframe CE DRS.

In an additional aspect of the disclosure, an apparatus configured for wideband coverage enhancement (WCE) in a wireless network is provided. For example, the apparatus of embodiments can include means for receiving (e.g., by a UE configured for WCE wireless communications in the wireless network) a multiple subframe coverage enhancement (CE) discovery reference signal (DRS) having both legacy system information block (SIB) message payload and WCE SIB message payload encoded therein, wherein the legacy SIB message payload comprises system information to aid one or more UE operable in the wireless network implementing a non-wideband coverage enhancement communication mode and the WCE SIB message payload comprises system information to aid one or more UE operable in the wireless network implementing a wideband coverage enhancement communication mode. The apparatus of embodiments can include means for determining (e.g., by the UE) if a location of one or more resources within the multiple subframe CE DRS indicates that the legacy SIB message payload and the WCE SIB message payload are independently encoded in the multiple subframe CE DRS or that the legacy SIB message payload and the WCE SIB message payload are jointly encoded in the multiple subframe CE DRS. The apparatus of embodiments can include means for decoding (e.g., by the UE) the WCE SIB message payload for use by the UE in implementing the wideband coverage enhancement communication mode if it is determined that the location of the one or more resources within the multiple subframe CE DRS indicates that the legacy SIB message payload and the WCE SIB message payload are independently encoded in the multiple subframe CE DRS.

The apparatus of embodiments can additionally or alternatively include means for decoding (e.g., by the UE) the legacy SIB message payload and the WCE SIB message payload for use by the UE in implementing the wideband coverage enhancement communication mode if it is determined that the location of the one or more resources within the multiple subframe CE DRS indicates that the legacy SIB message payload and the WCE SIB message payload are jointly encoded in the multiple subframe CE DRS.

In an additional aspect of the disclosure, a non-transitory computer-readable medium having program code for wideband coverage enhancement (WCE) in a wireless network recorded thereon is provided. The program code of embodiments can include program code for receiving (e.g., by a UE configured for WCE wireless communications in the wireless network) a multiple subframe coverage enhancement (CE) discovery reference signal (DRS) having both legacy system information block (SIB) message payload and WCE SIB message payload encoded therein, wherein the legacy SIB message payload comprises system information to aid one or more UE operable in the wireless network implementing a non-wideband coverage enhancement communication mode and the WCE SIB message payload comprises system information to aid one or more UE operable in the wireless network implementing a wideband coverage enhancement communication mode. The program code of embodiments can include program code for determining (e.g., by the UE) if a location of one or more resources within the multiple subframe CE DRS indicates that the legacy SIB message payload and the WCE SIB message payload are independently encoded in the multiple subframe CE DRS or that the legacy SIB message payload and the WCE SIB message payload are jointly encoded in the multiple subframe CE DRS. The program code of embodiments can include program code for decoding (e.g., by the UE) the WCE SIB message payload for use by the UE in implementing the wideband coverage enhancement communication mode if it is determined that the location of the one or more resources within the multiple subframe CE DRS indicates that the legacy SIB message payload and the WCE SIB message payload are independently encoded in the multiple subframe CE DRS. The program code of embodiments can additionally or alternatively include program code for decoding (e.g., by the UE) the legacy SIB message payload and the WCE SIB message payload for use by the UE in implementing the wideband coverage enhancement communication mode if it is determined that the location of the one or more resources within the multiple subframe CE DRS indicates that the legacy SIB message payload and the WCE SIB message payload are jointly encoded in the multiple subframe CE DRS.

In an additional aspect of the disclosure, an apparatus configured for wideband coverage enhancement (WCE) in a wireless network is provided. The apparatus includes at least one processor, and a memory coupled to the processor. The at least one processor of embodiments can be configured to receive (e.g., by a UE configured for WCE wireless communications in the wireless network) a multiple subframe coverage enhancement (CE) discovery reference signal (DRS) having both legacy system information block (SIB) message payload and WCE SIB message payload encoded therein, wherein the legacy SIB message payload comprises system information to aid one or more UE operable in the wireless network implementing a non-wideband coverage enhancement communication mode and the WCE SIB message payload comprises system information to aid one or more UE operable in the wireless network implementing a wideband coverage enhancement communication mode. The at least one processor of embodiments can be configured to determine, by the UE, if a location of one or more resources within the multiple subframe CE DRS indicates that the legacy SIB message payload and the WCE SIB message payload are independently encoded in the multiple subframe CE DRS or that the legacy SIB message payload and the WCE SIB message payload are jointly encoded in the multiple subframe CE DRS. The at least one processor of embodiments can be configured to decode (e.g., by the UE) the WCE SIB message payload for use by the UE in implementing the wideband coverage enhancement communication mode if it is determined that the location of the one or more resources within the multiple subframe CE DRS indicates that the legacy SIB message payload and the WCE SIB message payload are independently encoded in the multiple subframe CE DRS. The at least one processor of embodiments can additionally or alternatively be configured to decode (e.g., by the UE) the legacy SIB message payload and the WCE SIB message payload for use by the UE in implementing the wideband coverage enhancement communication mode if it is determined that the location of the one or more resources within the multiple subframe CE DRS indicates that the legacy SIB message payload and the WCE SIB message payload are jointly encoded in the multiple subframe CE DRS.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
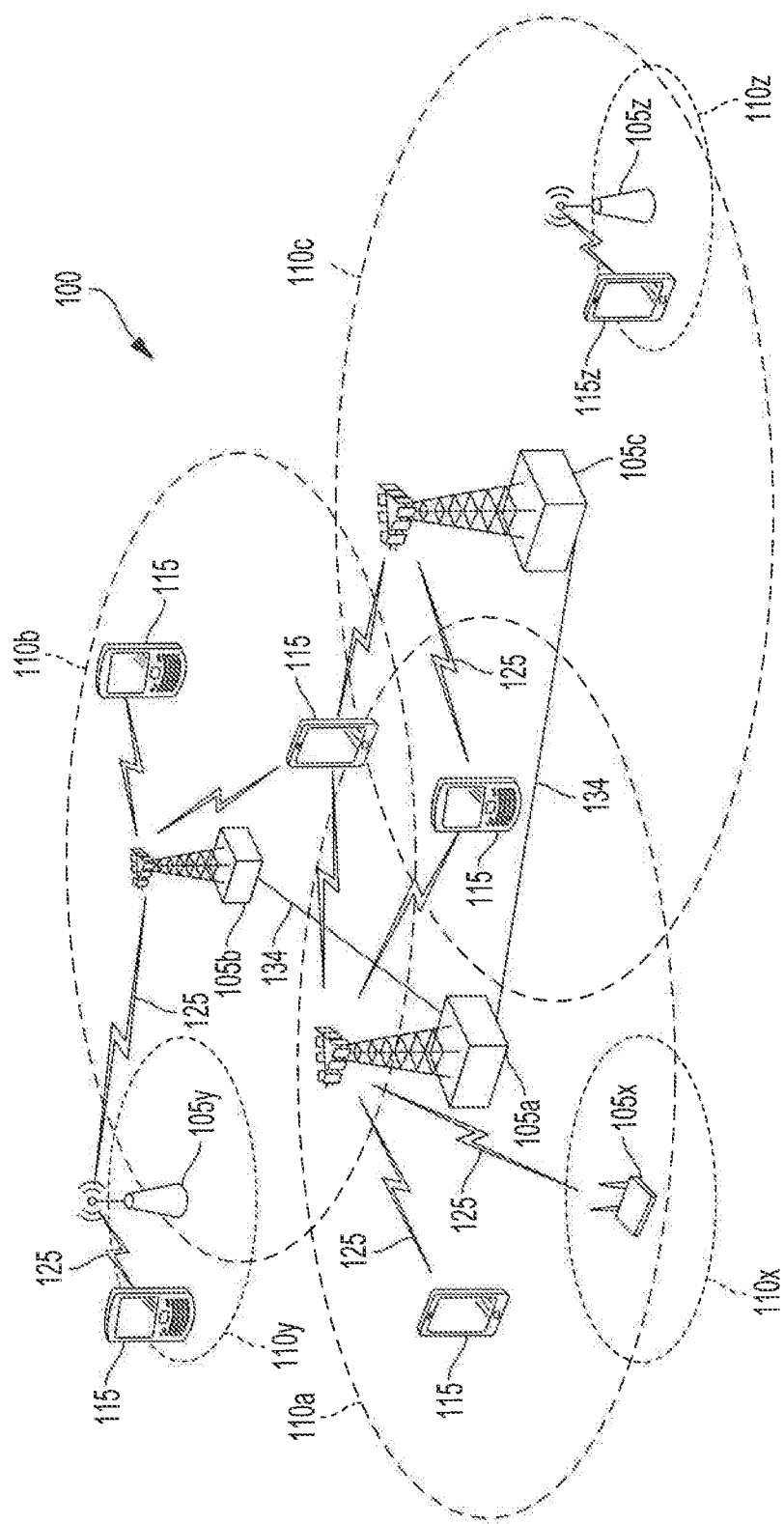
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces. While certain aspects of the innovations described herein may come about with respect to MuLTEfire Alliance compatible devices and networks, embodiments can also include devices and networks associated with or as standardized as part of 3GPP Release 15 or 16 or further specifications too.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or C node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
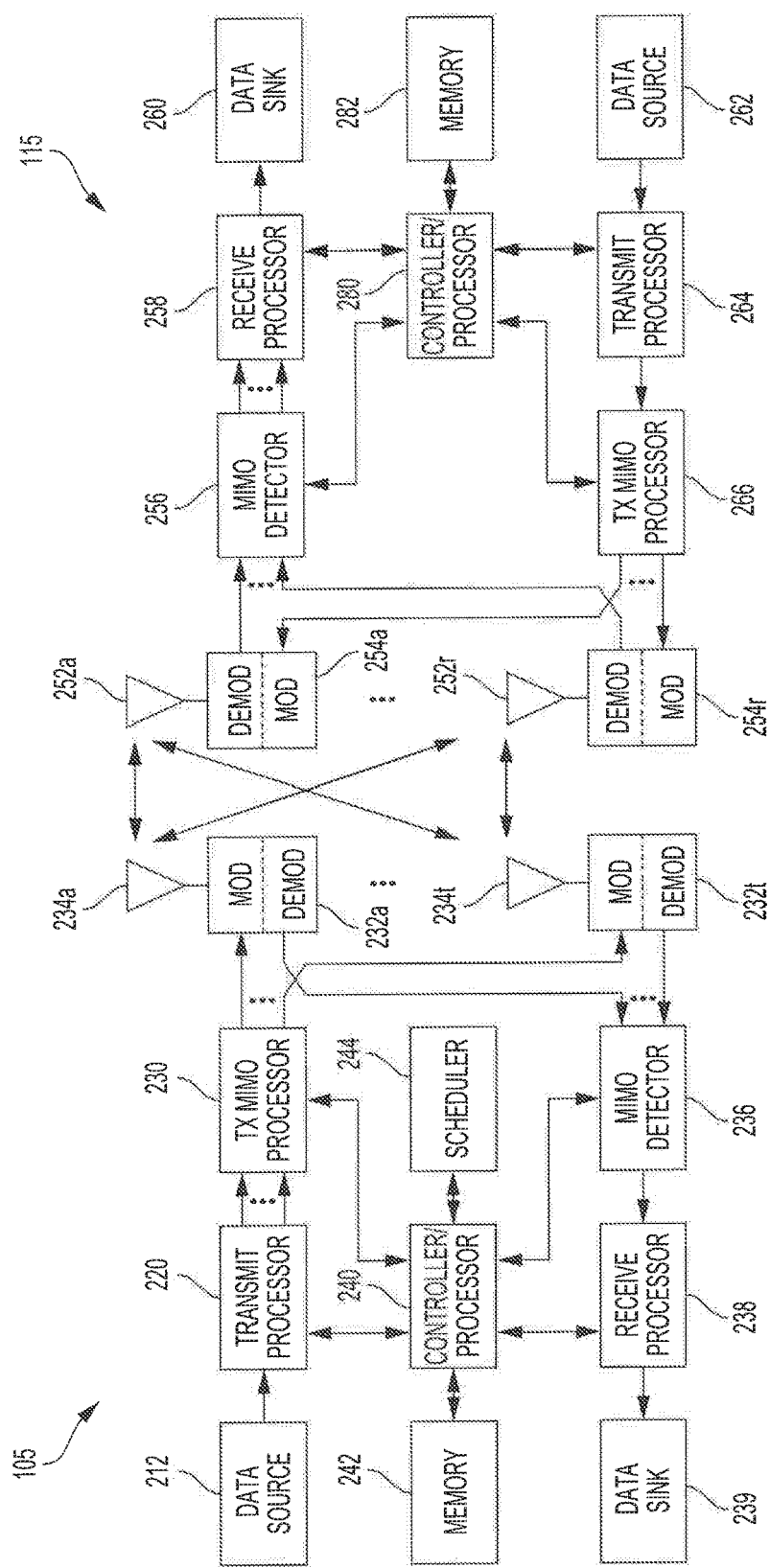
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of sonic other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232*a* through 232*t*. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from gNB 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 4-6, and/or other processes for the techniques described herein. Memories 242 and 282 may store data and program codes for gNB 105 and UE 115, respectively. Scheduler 244 may schedule UEs for data transmission on the downlink and/or uplink.

One strategy for serving increased demand for wireless communications while avoiding or minimizing added interference and congestion to cellular wireless networks is to make use of unlicensed spectrum. Although network operators may "densify" their cellular networks by deploying more small cells operable using licensed spectrum, such densification presents challenges with respect to interference and spectrum reuse resulting in practical limits on the communication capacity that may be served. Accordingly, supplementing or augmenting such licensed cellular network infrastructure with network infrastructure operating in unlicensed spectrum, such as 2.4 GHz, 5 GHz, etc., may be utilized to provide additional communication capacity. A challenge with the use of unlicensed spectrum, however, is that it is shared among multiple technologies and users, which impacts on the ability to ensure a seamless, high-quality experience at all times. This becomes particularly challenging in large venues, such as enterprises, stadiums, and campuses, or other areas where large numbers of people using wireless communications come together.

Various protocols and technologies, such as LTE, have been designed and effectively deployed for high-performance mobile broadband and hyper-dense deployments using licensed spectrum. Accordingly, attempts have been made to adapt some examples of such protocols and technologies for use with respect to unlicensed spectrum. For example, LTE technology has been adapted for use in unlicensed spectrum in the form of LTE-U (based on 3GPP Rel. Oct. 11, 2012 and defined by the LTE-U forum) and LAA (Licensed-Assisted Access as defined by 3GPP release 13). LTE-U/LAA, although facilitating the use of unlicensed spectrum, do not solely operate in unlicensed spectrum but instead are anchored in licensed spectrum. Accordingly, some portion of the licensed spectrum capacity remains occupied in supporting wireless communications according to LTE-U/LAA. Moreover, due to the necessity of a portion of licensed spectrum capacity for implementing LTE-U/LAA wireless communications, network operators that do not own licensed spectrum, such as Internet Service Providers and enterprise/venue owners, are generally unable to take advantage of these technologies.

Embodiments of gNB 105 and UE 115 operable in wireless network 100 are configured for implementing wireless communications using unlicensed spectrum (e.g. 2.4 GHz, 5 GHz, etc.), such as to provide communication capacity for offloading, supplementing, and/or augmenting licensed spectrum data communications, for serving increased demand for wireless communications, etc. For example, one or more of gNB 105*a*, 105*b*, 105*c*, 105*x*, 105*y*, and 105*z* and one or more of UEs 115 may be configured for using unlicensed spectrum technology, such as MULTE-FIRE (e.g., MuLTEfire Alliance MULTEFIRE Release 1.0 Jan. 17, 2017), providing wireless communications operating solely in unlicensed spectrum without requiring an anchor in licensed spectrum. Such gNBs and UEs may utilize LTE-based technology with respect to unlicensed spectrum wireless communications for facilitating high-performance mobile broadband and hyper-dense deployments. Accordingly, embodiments of gNBs 105 and UEs 115 may combine the performance benefits LTE technology (e.g., enhanced capacity, range, mobility, and quality-of-experience) with the simplicity of Wi-Fi-like deployments, such as by using signals and channelization of the robust LTE radio link, while also leveraging evolving LTE technologies for self-organizing small cells suited for hyper-dense deployments.

LTE technology utilizes various system information to aid the UE in operating in the communication network, such as in accessing a cell, performing cell reselection, provide information regarding intra-frequency, inter-frequency, and inter-RAT cell selections, etc. Such system information may comprise a static part (e.g., master information block (MIB)) and a dynamic part (e.g., one or more system information block (SIB) messages), such as may be broadcast by a gNB over a logical channel (e.g., broadcast control channel (BCCH)) and/or carried over one or more transport or other channel (e.g., broadcast channel (BCH), downlink shared channel (DL-SCH), etc.). For example, in operation according to existing LTE technology, a MIB may be transmitted using BCH and carried by PBCH, such as once every 40 ms, to provide information including channel bandwidth, PHICH configuration details, transmit power, number of antennas, and SIB scheduling information transmitted along with other information on the DL-SCH. Correspondingly, in operation according to existing LTE technology, one or more SIB messages (e.g., SIB1, SIB2, SIB3, etc.) of a SIB may be mapped on radio resource control (RRC) messages over DL-SCH and transmitted using PDSCH at periodic intervals, such as SIB1 transmitted every 80 ms, SIB2 transmitted every 160 ms, SIB3 transmitted every 320 ms, etc.

gNBs 105 and UEs 115 using unlicensed spectrum technology providing wireless communications operating solely in unlicensed spectrum, such as in accordance with MULTEFIRE technology, may implement LTE-based system information technology including MIBs and/or SIBs similar to that of existing LTE technology described above. For example, MULTEFIRE Release 1.0 defines a SIB message (SIB-MF1, corresponding to LTE SIB messages SIB1 and SIB2) to assist the UE when evaluating cell access and defining the schedule of the scheduling of other SIB messages as well as providing common and shared channel configuration information and random access channel (RACH) procedure configuration information. Such SIB-MF1 messages may, for example be used for initial synchronization, cell identification, measurement purposes, etc.

The MULTEFIRE SIB-MF1 message is part of a single subframe discovery reference signal (DRS) instance comprising synchronization signals, PBCH, PDCCH, and the SIB-MF1 message. The SIB-MF1 message comprises payload having various information elements (IEs), such as SIB1 system information, SIB2 system information, alternate cell access information, scheduling information, radio resource configuration information, etc. The foregoing IEs of the SIB-MF1 are carried by PDSCH in resource blocks (RBs) other than the center six resource blocks (RBs) of various ones of OFDM symbols 2-11 of the DRS subframe. The center six RBs of various ones of OFDM symbols 2-11 of the DRS subframe include synchronization signals, such as PSS and SSS reference signals (e.g., OFDM symbols 6 and 5 comprising PSS and SSS, respectively, and OFDM symbols 3 and 2 comprising extended primary synchronization signal (ePSS) and extended secondary synchronization signal (eSSS), respectively, wherein ePSS in MULTEFIRE are Chu sequence with different root index to the PSS and eSSS in MULTEFIRE is the same as SSS) and PBCH. OFDM symbols 0-1 of the DRS comprise the PDCCH (e.g. PDCCH takes the whole bandwidth of symbols 0-1 and uses CRS for channel and noise estimation).

Although the above described DRS and SIB-MF1 message facilitate performance benefits of LTE technology with respect to wireless communications implemented in unlicensed spectrum, the SIB-MF1 message does not support wideband coverage enhancement. For example, implementing wideband coverage enhancement (WCE) according to embodiments may utilize additional IEs in a SIB-MF1 message for facilitating wideband wireless communications.

Figure 3:
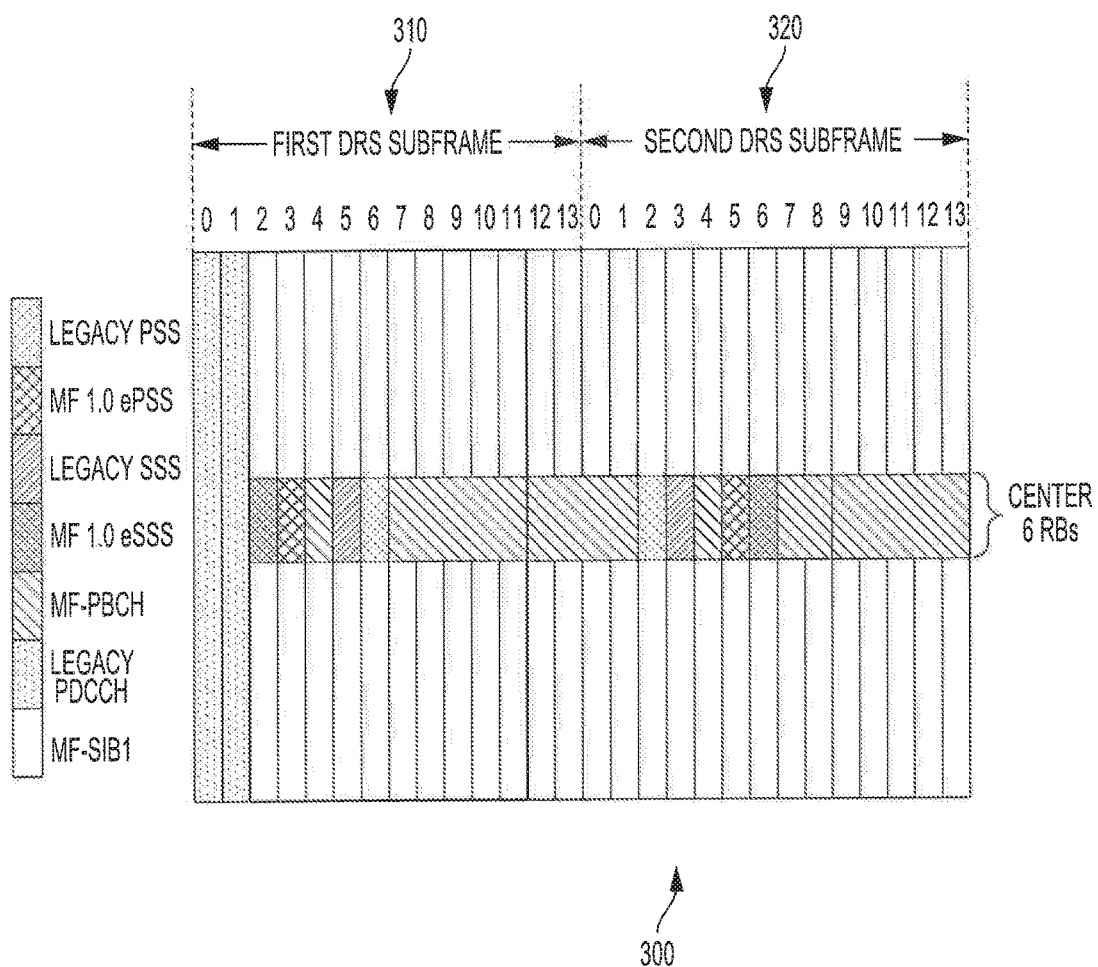
FIG. 3 shows a two subframe DRS configuration for supporting wideband coverage enhancement.

Accordingly, a two subframe DRS configuration to support WCE has been suggested to the MuLTEfire Alliance. In particular, a two subframe DRS instance according to the suggested two subframe DRS configuration for supporting WCE is shown as two subframe DRS instance 300 of FIG. 3. In the first DRS subframe (shown as first DRS subframe 310) of two subframe DRS instance 300, OFDM symbols 0-1 comprise the PDCCH, the center six RBs of OFDM symbols 4 and 7-13 comprise IEs carried by PBCH, and the center six RBs of OFDM symbols 3, 4, 5, and 6 comprise PSS and SSS reference signals (e.g., OFDM symbols 6 and 5 comprising PSS and SSS, respectively, and OFDM symbols 3 and 2 comprising ePSS and eSSS, respectively). In the second subframe (shown as second DRS subframe 320) of two subframe DRS instance 300, the center six RBs of OFDM symbols 0-1, 4, and 7-13 comprise IEs carried by PBCH, and the center six RBs of OFDM symbols 3, 4, 5, and 6 comprise PSS and SSS reference signals (e.g., OFDM symbols 2 and 3 comprising PSS and SSS, respectively, and OFDM symbols 5 and 6 comprising ePSS and eSSS, respectively).

Although the foregoing basic two subframe DRS structure has been suggested, there has heretofore been no proposal regarding how SIB-MF1 messages for WCE (referred to herein as WCE SIB-MF1 messages) and non-WCE SIB-MF1 messages (referred to herein as legacy SIB-MF1 messages) are conveyed for supporting both legacy and wideband coverage enhancement modes in a wireless network. Embodiments of the technology discussed herein are configured to encode and transmit information elements for both a legacy system information block and a wideband coverage enhancement system information block using a two subframe DRS configuration.

In developing a WCE SIB-MF1 message configuration of embodiments, it was determined that the maximum payload size that downlink control information (DCI) IA supports is 2216 bits. Thus, a DRS subframe payload (e.g., comprising a full feature legacy SIB-MF1 or comprising a combination of full feature legacy SIB-MF1 and WCE IEs) according to embodiments is configured to comprise up to 2216 bits. In configuring the WCE IEs to accommodate payload bit restrictions (e.g., the aforementioned 2216 bits), embodiments limit the SIB-MF1 features for WCE to lower the WCE SIB-MF1 message payload. For example, UEs implementing WCE wireless communications using unlicensed spectrum may be disposed further from a corresponding gNB than UEs implementing legacy wireless communication using licensed spectrum, or may otherwise experience lower quality communication links with the corresponding gNB, and thus the full features available with respect to the gNB may not be available to the UEs implementing such WCE wireless communications. Accordingly the number of bits used to assist a UE with respect to WCE wireless communications, such as when evaluating cell access and defining the schedule of the scheduling of other SIB messages as well as providing common and shared channel configuration information and random access channel (RACH) procedure configuration information, as may be provided in a WCE SIB-MF1 message may be reduced as compared to the bits used to assist a UE with respect to legacy wireless communications. For example, the WCE features with respect to the WCE SIB-MF1 message of embodiments may be limited to provide the payload bit parameters shown in the table below.

| SIB-MF1 IE | Number of bits for selected features for WCE | Number of bits for legacy SIB-MF1 |
|---|---|---|
| sib1-R1 OCTET STRING (CONTAINING SystemInformationBlockType1) | ~155 | ~800 |

-continued

| SIB-MF1 IE | Number of bits for selected features for WCE | Number of bits for legacy SIB-MF1 |
|---|---|---|
| sib2-R1 SystemInformaionBlockType2 | ~267 | ~536 |
| altCellAccessInfoList-R1 AltCellAccessInfoList-MF | 1 | 225 |
| schedulingInfoList-R1 SchedulingInfoList-MF | 144 | 200 |
| servCellDMTC-R1 MeasDS-Config-MF | 18 | 18 |
| Nhn-Identity-R1 NHN-Identity-MF | 41 | 40 |
| Psp-InfoSIB-MF1-R1 PSP-InfoSIB-MF1 | 121 | 121 |
| radioRe-sourceConfigCommon-R1 RadioRe-sourceConfigCommonSIB-MF | 48 | 100 |
| WCE configuration | 139 | 139 |
| Total | ~934 | ~2179 |

It should be appreciated that the WCE configuration IEs (139 bits in the example of the table above) may be included in legacy SIB-MF1 messages of embodiments when combining payloads for the two DRS subframes (e.g., jointly encoded legacy SIB-MF1 and WCE SIB-MF1 messages described below), but otherwise may be omitted from a legacy SIB-MF1 message of embodiments, such as when providing independent payloads for the two DRS subframes (e.g., independently encoded legacy SIB-MF1 and WCE SIB-MF1 messages described below).

The selected features for WCE of embodiments consistent with the example of the table above may, for example, include 3× public land mobile network (PLMN) ID and 5 participating service providers (PSP) ID, excluding application specific congestion control for data communication (ACDC) barring, PLMN-specific cell configuration, PLMN-specific access class barring (ACB), and any cellular Internet of things (CIoT) specific configuration, scheduling only 8 SIBs, and no CSI-RS measurements are added to the DRS measurement timing configuration (DMTC). The additional WCE IEs of the WCE SIB-MF1 message for WCE configuration of embodiments consistent with the example of the table above may, for example, include cell selection/reselection info for CE UEs, RACH resource indication for CE UEs and one or more related parameters, DMTC, measurement reporting configuration, extended physical downlink control channel (ePDCCH) configuration for common and dedicated control channel (e.g. ePDCCH takes 8/16 RBs of symbols 2-13 and uses the demodulation reference signal (DMRS) for channel estimation), SIB scheduling information (which may be different from legacy SIB-MF1 scheduling), and PDSCH configuration.

As shown in the table above, a full featured SIB-MF1 message (i.e., a SIB-MF1 message supporting the full features available with respect to the gNB) payload utilized to facilitate implementation of legacy wireless communications may comprise approximately 2179 bits. However, limiting the features for WCE can lower the estimated WCE SIB-MF1 message payload utilized to facilitate implementation of WCE wireless communications to ~934 bits, of which the WCE SIB-MF1 message payload with the selected features for WCE wireless communications is estimated to be 795 bits and the additional WCE IEs of the WCE SIB-MF1 message for WCE configuration estimated to be 139 bits.

In developing a two subframe CR-DRS configuration supporting legacy SIB-MF1 and WCE SIB-MF1 messages of embodiments, it was determined that PDSCH decoding SNR=−4 dB with MCS 0, 96 RB BW, EPA 3 kmph @ 5 GHz, TBS=2600 bits, BLER=10%. However, the SNR for decoding SIB-MF1 messages with one DRS subframe may be lowered to −8.45 dB, such as in the case of the aforementioned WCE SIB-MF1 message payload of ~934 bits (e.g., with a payload size of 2600 bits the required SNR=−4 dB, however with a payload size of only 934 bits the SNR=−4−10*log 10(2600/934)). Accordingly, single DRS frame WCE SIB-MF1 messages may be reliably utilized in some situations. Moreover, inefficient use of the DRS resources may result, at least in some situations, if IEs for the legacy SIB-MF1 message payload and WCE SIB-MF1 message payload are duplicated over the two DRS subframes. In light of the foregoing, embodiments may utilize a two subframe CR-DRS configuration in which a WCE SIB-MF1 message payload is encoded and transmitted in the two subframe CR-DRS instance independently with respect to a legacy SIB-MF1 message payload (such an embodiment referred to herein as independently encoded legacy SIB-MF1 and WCE SIB-MF1 messages). However, although the SNR for decoding full featured SIB-MF1 messages (e.g., the legacy SIB-MF1 portion of a WCE SIB-MF1 message in some situations) with one DRS subframe may be −4.7 dB, the SNR for decoding SIB-MF1 messages with two DRS subframes is −7.7 dB. Accordingly, embodiments may additionally or alternatively utilize a two subframe CR-DRS configuration in which both a legacy SIB-MF1 message payload and a WCE SIB-MF1 message payload share the same DRS subframe payload (such an embodiment referred to herein as jointly encoded legacy SIB-MF1 and WCE SIB-MF1 messages). For example, the legacy SIB-MF1 message payload and the WCE SIB-MF1 message payload are encoded and transmitted together in each of the two subframes of a two subframe CR-DRS instance of embodiments.

Figure 4:
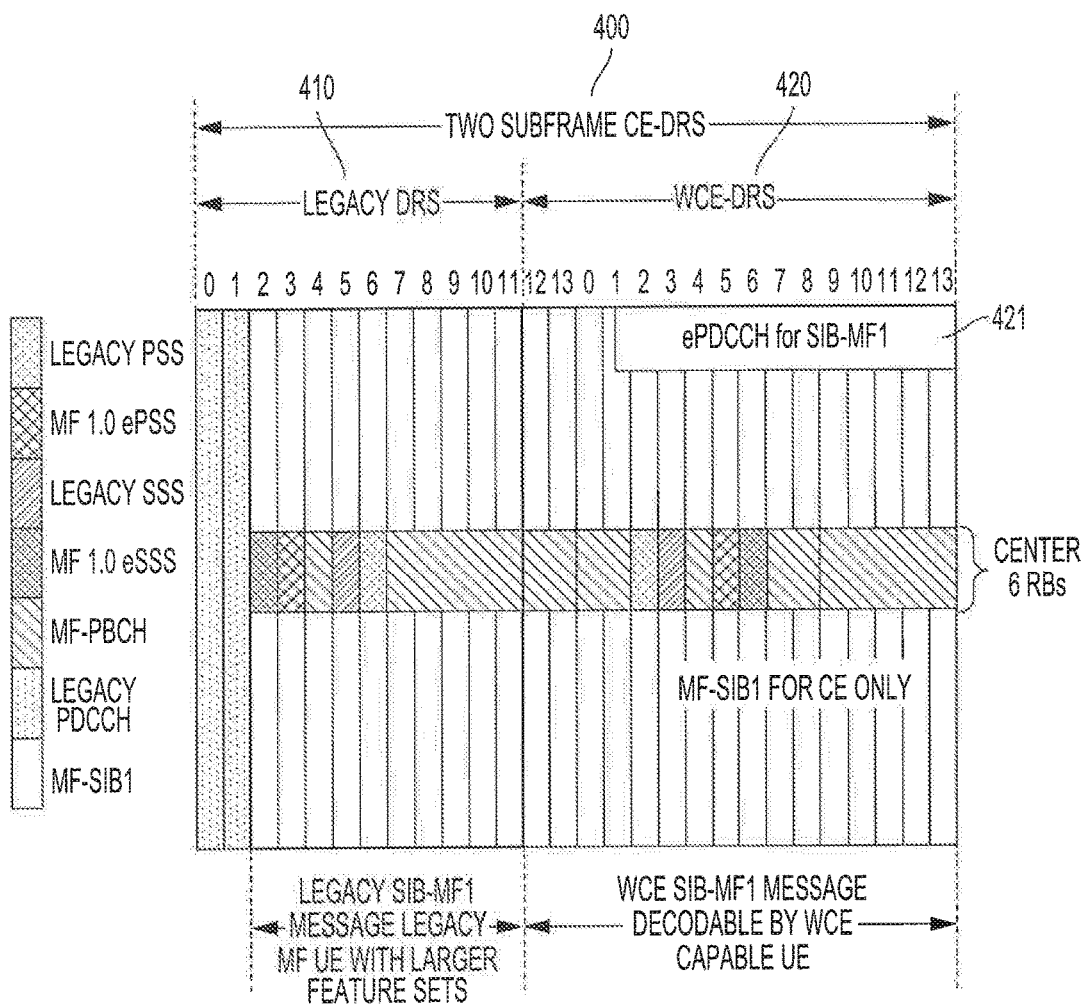
FIG. 4 shows an exemplary embodiment of a two subframe CR-DRS instance providing independently encoded legacy SIB-MF1 and WCE SIB-MF1 messages according to some embodiments of the present disclosure.

FIG. 4 illustrates an exemplary embodiment of a two subframe CR-DRS instance providing independently encoded legacy SIB-MF1 and WCE SIB-MF1 messages. Two subframe, CE-DRS 400 of the illustrated embodiment is configured to include legacy DRS 410 within a first DRS subframe and WCE-DRS 420 bridging the first DRS subframe and a second DRS subframe. In particular, legacy DRS 410 of the illustrated embodiment of two subframe CE-DRS 400 comprises OFDM symbols 0-11, where OFDM symbols 0-1 comprise the PDCCH, the RBs other than the center six RBs of OFDM symbols 2-11 comprise IEs carried by PDSCH, and the center six RBs of OFDM symbols 2-11 comprise synchronization signals (e.g., OFDM symbols 6 and 5 comprising PSS and SSS, respectively, and OFDM symbols 3 and 2 comprising ePSS and eSSS, respectively) and PBCH. WCE-DRS 420 of the illustrated embodiment of two subframe CE-DRS 400 comprises OFDM symbols 12-13 of the first DRS subframe and OFDM symbols 0-13 of the second DRS subframe, where the RBs other than the center six RBs of OFDM symbols 12-13 of the first DRS subframe comprise WCE IEs carried by PDSCH, the center six RBs of OFDM symbols 12-13 of the first DRS subframe comprise PBCH, the RBs other than the center six RBs of OFDM symbols 0-13 of the second DRS subframe comprise WCE IEs carried by PDSCH, and the center six RBs of OFDM symbols 0-13 of the second DRS subframe comprise synchronization signals (e.g., OFDM symbols 2 and 3 comprising PSS and SSS, respectively, and OFDM symbols 5 and 6 comprising ePSS and eSSS, respectively) and PBCH. Accordingly, WCE-DRS 420 provides additional DRS resources (e.g., additional OFDM symbols) as compared to legacy DRS 410, such as may be useful in lowering the SNR for decoding WCE SIB-MF1 messages by using an increased number of RBs to transmit a reduced number of bits.

In two subframe CR-DRS 400 of FIG. 4, the WCE SIB-MF1 message payload is encoded and transmitted independently with respect to the legacy SIB-MF1 message payload. In the illustrated embodiment, the legacy SIB-MF1 message payload is part of legacy DRS 410 and the WCE SIB-MF1 message payload is part of WCE-DRS 420. For example, in operation according to embodiments utilizing the independently encoded WCE SIB-MF1 message configuration of FIG. 4, the gNB (e.g., any of gNBs 105 of FIGS. 1 and 2, operating under control of controller/processor 240 executing an instruction set comprising logic operable to perform the functionality described herein), or other network element, generating and transmitting the two subframe CE-DRS encodes (e.g., using abstract syntax notation one (ASN.1) encoding or other suitable encoding techniques) and transmits the WCE SIB-MF1 message payload in WCE-DRS 420 of two subframe CE-DRS 400 independently with respect to the legacy SIB-MF1 message payload in legacy DRS 410 of two subframe CE-DRS 400 if the message payload of the SIB-MF1 message payload, including any WCE IEs therein (e.g., the aforementioned WCE configuration IEs) is twice or greater than the WCE SIB-MF1 message payload. Stated another way, the independently encoded legacy SIB-MF1 and WCE SIB-MF1 messages configuration is utilized according to embodiments if: (Legacy SIB-MF1 message payload size)≥(2·(WCE SIB-MF1 payload size)).

In developing the foregoing independently encoded legacy SIB-MF1 and WCE SIB-MF1 messages configuration, it was determined that in situations where the payload of the legacy SIB-MF1 message payload is twice or greater than the WCE SIB-MF1 message payload, combining the two message payloads for transmission in each of the DRS subframes (e.g., jointly encoded legacy SIB-MF1 and WCE SIB-MF1 messages) would not give as much gain as independently encoding the WCE SIB-MF1 message in the CE-DRS portion of the two DRS subframe instance. Accordingly, the embodiment of FIG. 4 operates to independently encode the WCE SIB-MF1 message with respect to the legacy SIB MF1 message in these conditions. It should be understood, however, that other thresholds and/or other decision metrics may be utilized in a determination with respect to use of independently encoded legacy SIB-MF1 and WCE SIB-MF1 messages, such as when implemented in environments or situations in which it may be determined that single DRS frame WCE SIB-MF1 messages may be reliably utilized based upon a factor other than 2 for the payload size of the legacy SIB-MF1 message to that of the payload size of the WCE SIB-MF1 message (e.g., as may be empirically determined from a relative gain in one or more performance metric realized using jointly encoded legacy SIB-MF1 and WCE SIB-MF1 messages).

In operation according to embodiments, legacy UEs that are not configured for WCE wireless communication (e.g., one or more of UEs 115 of FIGS. 1 and 2, operating under control of controller/processor 280 executing an instruction set comprising logic operable to perform the functionality described herein) may nevertheless decode (e.g., using receive processor 258) and utilize the legacy SIB-MF1 messages, provided in the legacy DRS payload, with respect to legacy wireless communications (e.g., wireless communications using licensed spectrum). Where WCE IEs (e.g., the WCE configuration IEs) are included in the legacy SIB-MF1 message of a two subframe CE-DRS of embodiments, the legacy UEs may operate to ignore these additional IEs. However, UEs configured for WCE wireless communications (e.g., one or more of UEs 115 of FIGS. 1 and 2, operating under control of controller/processor 280 executing an instruction set comprising logic operable to perform the functionality described herein) may decode (e.g., using receive processor 258) and utilize the WCE SIB-MF1 messages, provided in the WCE-DRS, with respect to WCE wireless communications (e.g., wireless communications using unlicensed spectrum). Moreover, UEs configured for WCE wireless communication may additionally or alternatively decode and utilize the legacy SIB-MF1 messages, provided in the legacy DRS, with respect to legacy wireless communications (e.g., wireless communications using licensed spectrum).

To indicate to a UE that an independently encoded legacy SIB-MF1 and WCE SIB-MF1 messages configuration is being utilized in the two subframe CE-DRS instance, the embodiment of FIG. 4 places the ePDCCH (e.g., ePDCCH 421) utilized with respect to the WCE SIB-MF1 message in the CE-DRS of the two subframe CE-DRS instance. Although ePDCCH 421 is shown disposed in RBs of OFDM symbols 2-13 of CE-DRS in the illustrated embodiment, the ePDCCH of embodiments may be placed anywhere within the CE-DRS to indicate utilization of an independently encoded WCE SIB-MF1 message configuration.

Figure 5:
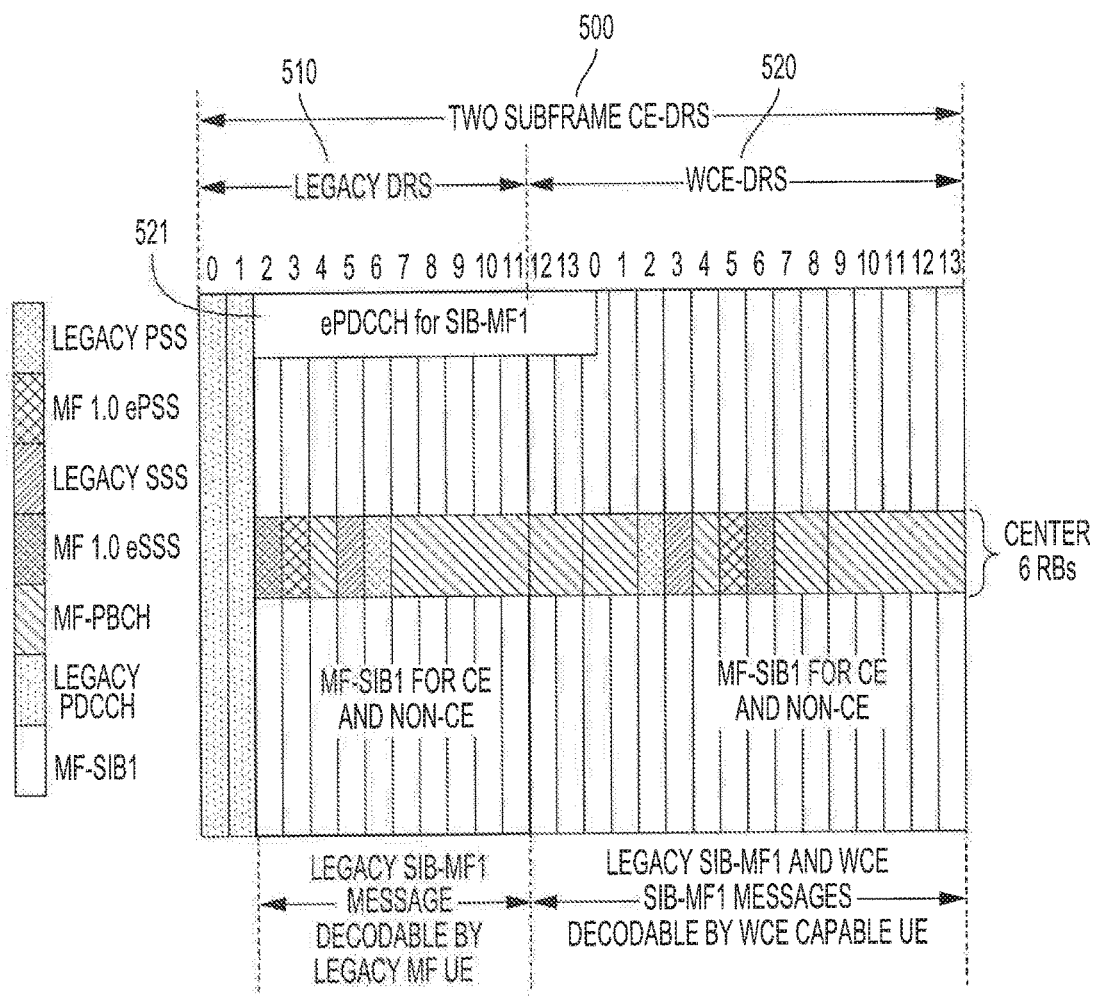
FIG. 5 shows an exemplary embodiment of a two subframe CR-DRS instance providing jointly encoded legacy SIB-MF1 and WCE SIB-MF1 messages according to some embodiments of the present disclosure.

FIG. 5 illustrates an exemplary embodiment of a two subframe CR-DRS instance providing jointly encoded legacy SIB-MF1 and WCE SIB-MF1 messages. Two subframe CE-DRS 500 of the illustrated embodiment is configured to include legacy DRS 510 within a first DRS subframe and WCE-DRS 520 bridging the first DRS subframe and a second DRS subframe. In particular, legacy DRS 510 of the illustrated embodiment of two subframe CE-DRS 500 comprises OFDM symbols 0-11, where OFDM symbols 0-1 comprise the PDCCH, the RBs other than the center six RBs of OFDM symbols 2-11 comprise IEs carried by PBCH, and the center six RBs OFDM symbols 2-11 comprise synchronization signals (e.g., OFDM symbols 6 and 5 comprising PSS and SSS, respectively, and OFDM symbols 3 and 2 comprising ePSS and eSSS, respectively) and PBCH, consistent with two subframe CR-DRS 400 of FIG. 4. It should be appreciated that two subframe CE-DRS 500 provides a configuration facilitating use by the UEs that are not configured for WCE wireless communication (e.g., UEs that are not configured for WCE wireless communication may operate to decode payload of legacy DRS 410 and 510 in the same way, ignoring any WCE IEs therein). WCE-DRS 520 of the illustrated embodiment of two subframe CE-DRS 500 comprises OFDM symbols 12-13 of the first DRS subframe and OFDM symbols 0-13 of the second DRS subframe, where the RBs other than the center six RBs of OFDM symbols 12-13 of the first DRS subframe comprise IEs carried by PDSCH, the center six RBx of OFDM symbols 12-13 of the first DRS subframe comprise PBCH, the RBs other than the center six RBs of OFDM symbols 0-13 of the second DRS subframe comprise IEs carried by PDSCH, and the center six RBs of OFDM symbols 0-13 of the second DRS subframe comprise synchronization signals (e.g., OFDM symbols 2 and 3 comprising PSS and SSS, respectively, and OFDM symbols 5 and 6 comprising ePSS and eSSS, respectively) and PBCH. The RBs other than the center six RBs of OFDM symbols 2-13 in the first DRS subframe and OFDM symbols 0-13 in second DRS subframe may, for example, comprise PDSCH which carries SIB-MF1, paging message, user data, and/or ePDCCH which carries scheduling information for SIB-MF1.

In two subframe CR-DRS 500 of FIG. 5, the WCE SIB-MF1 message payload is encoded and transmitted in combination with the legacy SIB-MF1 message payload (e.g., both the legacy SIB-MF1 message payload and the WCE SIB-MF1 message payload share the same DRS subframe payload). In the illustrated embodiment, the legacy SIB-MF1 message payload and the WCE SIB-MF1 message payload are encoded and transmitted together in the two subframe CE-DRS instance, where the legacy SIB-MF1 message payload and the WCE SIB-MF1 message payload are part of legacy DRS 510 and this combined payload is repeated in WCE-DRS 520. For example, in operation according to embodiments utilizing the jointly encoded legacy SIB-MF1 and WCE SIB-MF1 messages configuration of FIG. 5, the gNB (e.g., any of gNBs 105 of FIGS. 1 and 2, operating under control of controller/processor 240 executing an instruction set comprising logic operable to perform the functionality described herein), or other network element, generating and transmitting the two subframe CE-DRS encodes (e.g., using abstract syntax notation one (ASN.1) encoding or other suitable encoding techniques) and transmits the legacy SIB-MF1 message payload and the WCE SIB-MF1 message payload in both legacy DRS 510 and WCE-DRS 520 of two subframe CE-DRS 500 if the message payload of the SIB-MF1 message payload, including any WCE IEs therein (e.g., the aforementioned WCE configuration IEs) is less than twice the WCE SIB-MF1 message payload. Stated another way, the jointly encoded legacy SIB-MF1 and WCE SIB-MF1 messages configuration is utilized according to embodiments if: (Legacy SIB-MF1 message payload size)<(2·(WCE SIB-MF1 payload size)).

In developing the foregoing the jointly encoded legacy SIB-MF1 and WCE SIB-MF1 messages configuration, it was determined that in situations where the payload of the legacy SIB-MF1 message payload is less than twice the WCE SIB-MF1 message payload, combining the two message payloads for transmission in each of the DRS subframes (e.g., jointly encoded legacy SIB-MF1 and WCE SIB-MF1 messages) would give as much or more gain as independently encoding the WCE SIB-MF1 message in the CE-DRS portion of the two DRS subframe instance. Accordingly, the embodiment of FIG. 5 operates to jointly encode the legacy SIB-MF1 message with the WCE SIB-MF1 message in these conditions. It should be understood, however, that other thresholds and/or other decision metrics may be utilized in a determination with respect to use of jointly encoded legacy SIB-MF1 and WCE SIB-MF1 messages, such as when implemented in environments or situations (e.g., differing operational circumstances) in which it may be determined that multiple DRS frame WCE SIB-MF1 messages provide a desired improvement with respect to their decoding an use based upon a factor other than 2 for the payload size of the legacy SIB-MF1 message to that of the payload size of the WCE SIB-MF1 message (e.g., as may be empirically determined from a relative gain in one or more performance metric realized using jointly encoded legacy SIB-MF1 and WCE SIB-MF1 messages). Further, although corresponding thresholds have been described with respect to a determination to use independently encoded legacy SIB-MF1 and WCE SIB-MF1 messages and a determination to use jointly encoded legacy SIB-MF1 and WCE SIB-MF1 messages, embodiments of the present disclosure may utilize independent or different thresholds and/or other metrics in determinations for use of independently encoded legacy SIB-MF1 and WCE SIB-MF1 messages and determinations for use of jointly encoded legacy SIB-MF1 and WCE SIB-MF1 messages, possibly selecting a default or preferred SIB encoding configuration where a conflict is present in the determinations.

In operation according to embodiments, legacy UEs that are not configured for WCE wireless communication (e.g., one or more of UEs 115 of FIGS. 1 and 2, operating under control of controller/processor 280 executing an instruction set comprising logic operable to perform the functionality described herein) may nevertheless decode (e.g., using receive processor 258) and utilize the legacy SIB-MF1 messages, provided in the legacy DRS payload, with respect to legacy wireless communications (e.g., wireless communications using licensed spectrum). Although WCE IEs are included with the legacy SIB-MF1 message in the legacy DRS payload of a two subframe CE-DRS of embodiments due to the joint encoding, the legacy UEs may operate to ignore the additional IEs. UEs configured for WCE wireless communications (e.g., one or more of UEs 115 of FIGS. 1 and 2, operating under control of controller/processor 280 executing an instruction set comprising logic operable to perform the functionality described herein) may decode (e.g., using receive processor 258) and utilize the WCE SIB-MF1 messages, an instance of which is provided in both the legacy DRS and the WCE-DRS, with respect to WCE wireless communications (e.g., wireless communications using unlicensed spectrum). Moreover, UEs configured for WCE wireless communication may additionally or alternatively decode (e.g., using receive processor 258) and utilize the legacy SIB-MF1 messages, an instance of which is provided in both the legacy DRS and the WCE-DRS, with respect to legacy wireless communications (e.g., wireless communications using licensed spectrum). Because the foregoing message payloads utilized by the UEs configured for WCE wireless communications are repeated in the two subframe CE-DRS configuration of embodiments, these UEs may utilize various techniques, such as data comparison, to provide improved recovery of the message payloads and/or to facilitate message payload recovery using lower quality communication links.

In order to indicate to a UE that a jointly encoded legacy SIB-MF1 and WCE SIB-MF1 messages configuration is being utilized in the two subframe CE-DRS instance, the embodiment of FIG. 5 places the ePDCCH (e.g., ePDCCH 521) utilized with respect to the WCE SIB-MF1 message in the legacy DRS of the two subframe CE-DRS instance. It should be understood that, although ePDCCH 521 is shown disposed in RBs of OFDM symbols 2-13 of legacy DRS in the illustrated embodiment, the ePDCCH of embodiments may be placed anywhere within the CE-DRS to indicate utilization of a jointly encoded WCE SIB-MF1 message configuration.

Although embodiments have been described as indicating whether an individually encoded legacy SIB-MF1 and WCE SIB-MF1 messages configuration or a jointly encoded legacy SIB-MF1 and WCE SIB-MF1 messages configuration is being utilized by placing the ePDCCH in either the WCE-DRS or legacy DRS, other techniques may additionally or alternatively be utilized for this indication. For example, embodiments may use 1 bit out of the 7 reserved MIB-MF bits to indicate whether an individually encoded legacy SIB-MF1 and WCE SIB-MF1 messages configuration or a jointly encoded legacy SIB-MF1 and WCE SIB-MF1 messages configuration is being utilized (e.g., by a 0 bit value indicating one such configuration and a 1 bit value indicating the other such configuration).

Figure 6:
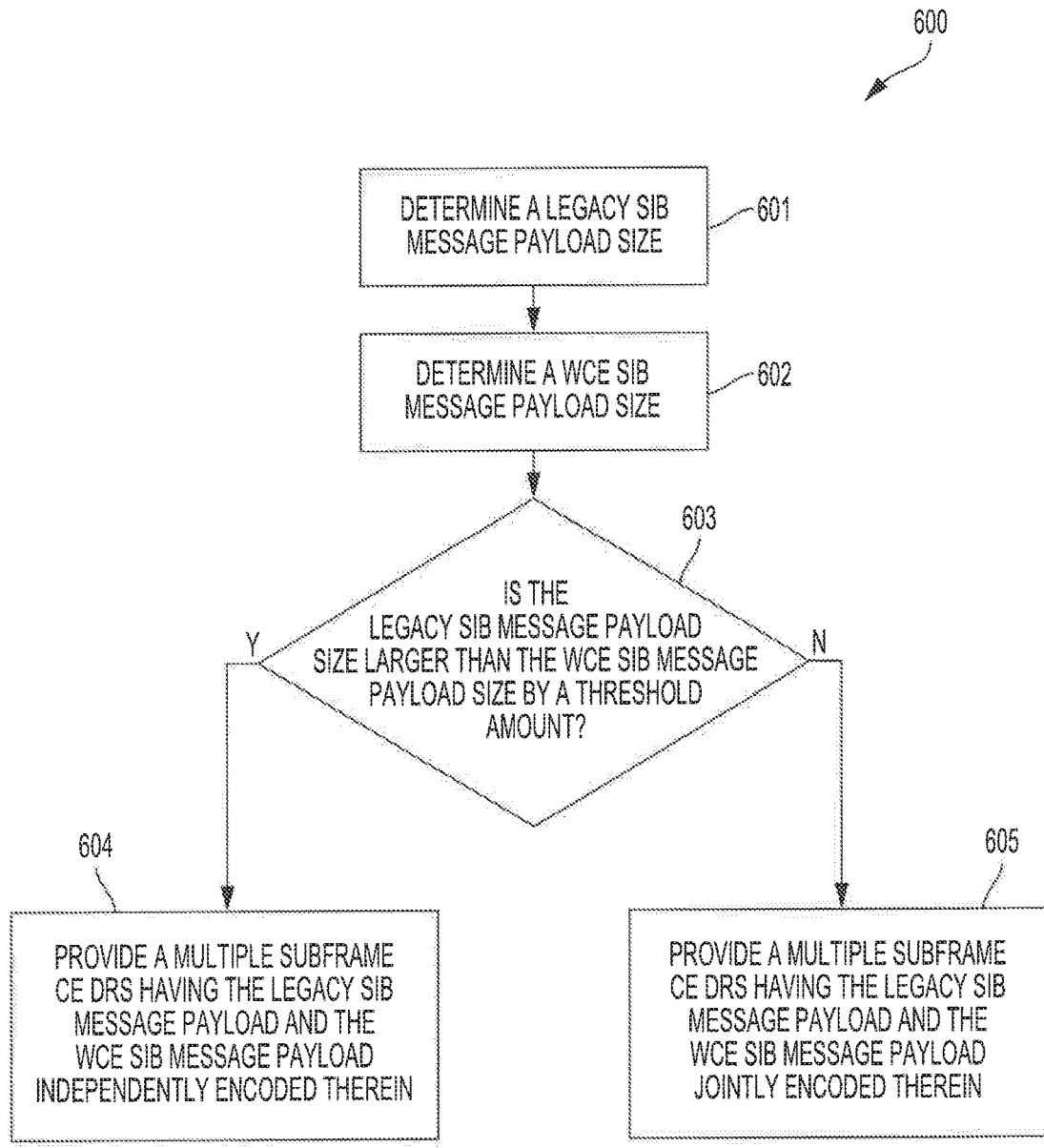
FIG. 6 shows a flow diagram providing operation for wideband coverage enhancement according to some embodiments of the present disclosure.

FIG. 6 shows flow 600 providing operation according to embodiments for wideband coverage enhancement consistent with the foregoing. At block 601 of the illustrated embodiment of flow 600 a gNB (e.g., any or all of gNBs 105 of FIG. 1) or other network element may operate (e.g., under control of controller/processor 240 executing an instruction set comprising logic operable to perform the functionality described herein) to determine a legacy system information block (SIB) message payload size, wherein the legacy SIB message comprises system information to aid one or more UE (e.g., any or all of UEs 115 of FIG. 1) implementing a legacy, non-wideband coverage enhancement communication mode in a wireless network (e.g., using licensed spectrum in a wireless communication network). Additionally, at block 602 of the illustrated embodiment, the gNB or other network element may operate to determine a WCE SIB message payload size, wherein the WCE SIB message comprises system information to aid one or more UE (e.g., any or all of UEs 115 of FIG. 1) implementing a wideband coverage enhancement communication mode in the wireless network (e.g., using unlicensed spectrum in a wireless communication network). In operation at block 603 according to the illustrated embodiment of flow 600, the gNB or other network element may further operate (e.g., under control of controller/processor 240 executing an instruction set comprising logic operable to perform the functionality described herein) to determine if the legacy SIB message payload size is larger than the WCE SIB message payload size by a threshold amount (e.g., the threshold amount may be a multiplier of 2, wherein it is determined if (Legacy SIB-MF1 message payload size)≥(2·(WCE SIB-MF1 payload size) or if (Legacy SIB-MF1 message payload size)< (2·(WCE SIB-MF1 payload size)). Operation of the gNB or other network element (e.g., under control of controller/processor 240 executing an instruction set comprising logic operable to perform the functionality described herein) at block 604 may provide (e.g., generate and transmit, using transmit processor 220) a multiple subframe coverage enhancement (CE) discovery reference signal (DRS) having the legacy SIB message payload and the WCE SIB message payload independently encoded therein if the legacy SIB message payload size is larger than the WCE SIB message payload by the threshold amount. Alternatively, operation of the gNB or other network element (e.g., under control of controller/processor 240 executing an instruction set comprising logic operable to perform the functionality described herein) at block 605 may provide (e.g., generate and transmit, using transmit processor 220) the multiple subframe CE DRS having the legacy SIB message payload and the WCE SIB message payload jointly encoded therein if the legacy SIB message payload size is not larger than the WCE SIB message payload by the threshold amount.

Figure 7:
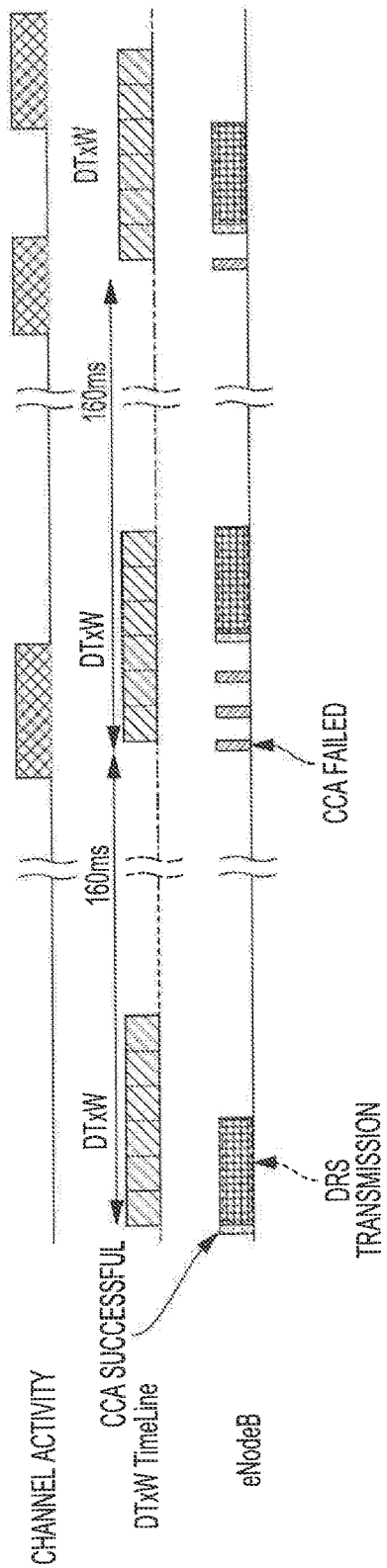
FIG. 7 shows examples of DRS subframe timing according to some embodiments of the present disclosure.

CRS, such as may be utilized for cell search and initial acquisition, downlink quality measurements, downlink channel estimation for coherent demodulation, etc., is a component of the two subframe CE-DRS of embodiments (e.g., CRS may be a component of the legacy DMS and/or WCE DMS). It should be appreciated that DRS can start in any subframe in the discontinuous transmission (DTxW) window, as shown in FIG. 7. However, legacy CRS scrambling depends on the subframe number (i.e., the scrambling rule of subframe number n (SF#n) if it is on subframe number n (SF#n). Accordingly, a UE utilizing legacy CRS scrambling may need to descramble CRS to decode PBCH after PSS/SSS detection before knowing the subframe number. In MULTEFIRE Release 1.0 the DRS subframe implements a scrambling rule in which the scrambling of subframe number 0 (SF#0) is used if the DRS falls in any of subframe numbers 0-4 (SF#0, SF#1, SF#2, SF#3, or SF#4) and the scrambling of subframe number 5 (SR#5) is used if the DRS falls in any of subframe numbers 5-9 (SF#5, SF#6, SF#7, SF#8, or SF#9). Embodiments of a two subframe CE-DRS configuration herein implement a CRS scrambling rule with respect to legacy SIB-MF1 messages to maintain compatibility with respect to legacy UEs (i.e., UEs that are not configured for WCE wireless communication). New CRS scrambling rules applied with respect to the CE-DRS of embodiments may thus prevent multiplexing other downlink control and data (e.g., paging) in DTxW of DRS subframes. However, dual CRS scrambling rules for decoding multiplexed control and data increases UE complexity for UEs not in initial synchronization. Accordingly, embodiments of a two subframe CE-DRS configuration in which CRS scrambling rules utilized with respect to a WCE DRS of the two subframe CE-DRS are based at least in part on the CRS scrambling rules utilized with respect to a legacy SIB-DRS of the two subframe CE-DRS.

In operation according to embodiments, the gNB (e.g., any of gNBs 105 of FIGS. 1 and 2, operating under control of controller/processor 240 executing an instruction set comprising logic operable to perform the functionality described herein), or other network element, generating and transmitting the two subframe CE-DRS may, for the center six RBs of the CE-DRS, use the scrambling of subframe number 1 (SF#1) if the legacy DRS (the first DRS of the two subframe CE-DRS) falls in any of subframe numbers 0-4 (SF#0, SF#1, SF#2, SF#3, or SF#4) and use the scrambling of subframe number 6 (SF#6) if the legacy DRS falls in any of subframe numbers 5-9 (SF#5, SF#6, SF#7, SF#8, or SF#9). This gNB may, for RBs other than the center six RBs of the CE-DRS, also use the scrambling of subframe number 1 (SF#1) if the legacy DRS falls in any of subframe numbers 0-4 (SF#0, SF#1, SF#2, SF#3, or SF#4) and use the scrambling of subframe number 6 (SF#6) if the legacy DRS falls in any of subframe numbers 5-9 (SF#5, SF#6, SF#7, SF#8, or SF#9). Such an embodiment allows for multiplexing other downlink control and data into two DRS subframes if listen before talk (LBT) (e.g., as may be implemented in the clear channel assessment (CCA) algorithm) clears at subframe number 0 (SF#0) or subframe number 5 (SF#5), which is likely in lightly loaded scenarios. Alternatively, the aforementioned gNB may, for RBs other than the center six RBs of the CE-DRS, may use the legacy subframe dependent CRS scrambling rule (i.e., the scrambling rule of subframe number n (SF#n) if it is on subframe number n (SF#n) if the DRS falls in any of subframe numbers 5-9 (SE#5, SF#6, SF#7, SF#8, or SF#9). Such an embodiment allows multiplexing other downlink control and data in the second DRS subframe regardless of the location in DTxW where the CE-DRS is transmitted. Other UEs not in initial synchronization procedure may read the multiplexed downlink control and data using the legacy CRS scrambling rule except the center 6 RBs.

Although embodiments herein have been described with reference to wideband coverage enhancement utilizing unlicensed spectrum, the concepts herein are applicable to various contention-based communications, whether utilizing unlicensed and/or licensed spectrum. Accordingly, the two subframe CD DRS and CRS scrambling rules of embodiments herein may be utilized for facilitating wideband wireless communications in unlicensed spectrum, licensed spectrum, and combinations thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 2 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), are application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wideband coverage enhancement (WCE) in a wireless network, the method comprising;
   determining, by controller logic of a base station operable in the wireless network, if a legacy system information block (SIB) message payload size is larger than a WCE SIB message payload size by a threshold amount, wherein the legacy SIB message payload comprises system information to aid one or more UE operable in the wireless network implementing a non-wideband coverage enhancement communication mode and the WCE SIB message payload comprises system information to aid one or more UE operable in the wireless network implementing a wideband coverage enhancement communication mode;

if the legacy SIB message payload size is larger than the WCE SIB message payload by the threshold amount, transmitting, using a transmit processor of the base station, a multiple subframe coverage enhancement (CE) discovery reference signal (DRS) having the legacy SIB message payload and the WCE SIB message payload independently encoded therein; and if the legacy SIB message payload size is not larger than the WCE SIB message payload by the threshold amount, transmitting, using a transmit processor of the base station, the multiple subframe CE DRS having the legacy SIB message payload and the WCE SIB message payload jointly encoded therein.

2. The method of claim 1, wherein the threshold amount comprises the legacy SIB message payload size being at least twice the WCE SIB message payload size.

3. The method of claim 1, wherein the multiple subframe CE DRS comprises a legacy DRS and a WCE-DRS, wherein if the legacy SIB message payload size is larger than the WCE SIB message payload by the threshold amount the legacy SIB message payload is communicated in the legacy DRS and the WCE SIB message payload is communicated in the WCE-DRS, and wherein if the legacy SIB message payload size is not larger than the WCE SIB message payload by the threshold amount the legacy SIB message payload and the WCE SIB message payload are each communicated in both the legacy DRS and the WCE-DRS.

4. The method of claim 3, wherein the WCE-DRS comprises more resources of the multiple subframe CE DRS than the legacy DRS.

5. The method of claim 3, further comprising:
if the legacy SIB message payload size is larger than the WCE SIB message payload by the threshold amount, indicating that the legacy SIB message payload and the WCE SIB message payload are independently encoded in the multiple subframe CE DRS by placing an extended physical downlink control channel (ePDCCH) in the WCE-DRS.

6. The method of claim 3, further comprising:
if the legacy SIB message payload size is not larger than the WCE SIB message payload by the threshold amount, indicating that the legacy SIB message payload and the WCE SIB message payload are jointly encoded in the multiple subframe CE DRS by placing an extended physical downlink control channel (ePDCCH) in the legacy DRS.

7. The method of claim 3, wherein the WCE-DRS comprises a cell specific reference signal (CRS), the method further comprising:
using scrambling of subframe number 1 for a first set of resource blocks (RBs) in the WCE-DRS if a first DRS falls in any of subframe numbers 0 through 4; and
using scrambling of subframe number 6 for the first set of RBs in the WCE-DRS if the first DRS falls in any of subframe numbers 5 through 9.

8. The method of claim 7, further comprising:
using scrambling of subframe number 1 for RBs in the WCE-DRS other than the first set RBs if a first DRS falls in any of subframe numbers 0 through 4; and
using scrambling of subframe number 6 for RBs in the WCE-DRS other than the first set of RBs if the first DRS falls in any of subframe numbers 5 through 9.

9. The method of claim 7, further comprising:
using a legacy scrambling rule for RBs in the WCE-DRS other than the first set RBs.

10. The method of claim 9, wherein the legacy scrambling rule comprises:

when the legacy DRS and the WCE-DRS of the multiple subframe CE DRS fall in subframes n and n+1 respectively, using scrambling of subframe number n for RBs of the legacy DRS and scrambling of subframe number n+1 for RBs of the WCE-DRS.

11. An apparatus configured for wideband coverage enhancement (WCE), the apparatus comprising:
at least one processor; and
a memory coupled to the processor, wherein the at least one processor is configured:
to determine, by a base station operable in the wireless network, if a legacy system information block (SIB) message payload size is larger than a WCE SIB message payload size by a threshold amount, wherein the legacy SIB message payload comprises system information to aid one or more UE operable in the wireless network implementing a non-wideband coverage enhancement communication mode and the WCE SIB message payload comprises system information to aid one or more UE operable in the wireless network implementing a wideband coverage enhancement communication mode;
to transmit, by the base station, a multiple subframe coverage enhancement (CE) discovery reference signal (DRS) having the legacy SIB message payload and the WCE SIB message payload independently encoded therein if the legacy SIB message payload size is larger than the WCE SIB message payload by the threshold amount; and
to transmit, by the base station, the multiple subframe CE DRS having the legacy SIB message payload and the WCE SIB message payload jointly encoded therein if the legacy SIB message payload size is not larger than the WCE SIB message payload by the threshold amount.

12. The apparatus of claim 11, wherein the threshold amount comprises the legacy SIB message payload size being at least twice the WCE SIB message payload size.

13. The apparatus of claim 11, wherein the multiple subframe CE DRS comprises a legacy DRS and a WCE-DRS, wherein if the legacy SIB message payload size is larger than the WCE SIB message payload by the threshold amount the legacy SIB message payload is communicated in the legacy DRS and the WCE SIB message payload is communicated in the WCE-DRS, and wherein if the legacy SIB message payload size is not larger than the WCE SIB message payload by the threshold amount the legacy SIB message payload and the WCE SIB message payload are each communicated in both the legacy DRS and the WCE-DRS.

14. The apparatus of claim 13, wherein the WCE-DRS comprises more resources of the multiple subframe CE DRS than the legacy DRS.

15. The apparatus of claim 13, wherein the at least one processor is further configured:
to indicate that the legacy SIB message payload and the WCE SIB message payload are independently encoded in the multiple subframe CE DRS by placing an extended physical downlink control channel (ePDCCH) in the WCE-DRS if the legacy SIB message payload size is larger than the WCE SIB message payload by the threshold amount.

16. The apparatus of claim 13, wherein the at least one processor is further configured:
to indicate that the legacy SIB message payload and the WCE SIB message payload are jointly encoded in the multiple subframe CE DRS by placing an extended physical downlink control channel (ePDCCH) in the legacy DRS if the legacy SIB message payload size is not larger than the WCE SIB message payload by the threshold amount.

17. The apparatus of claim 13, wherein the WCE-DRS comprises a cell-specific reference signal (CRS), wherein the at least one processor is further configured:
  to use scrambling of subframe number 1 for a first set of resource blocks (RBs) in the WCE-DRS if a first DRS falls in any of subframe numbers 0 through 4; and
  to use scrambling of subframe number 6 for the first set of RBs in the WCE-DRS if the first DRS falls in any of subframe numbers 5 through 9.

18. The apparatus of claim 17, wherein the at least one processor is further configured:
  to use scrambling of subframe number 1 for RBs in the WCE-DRS other than the first set RBs if a first DRS falls in any of subframe numbers 0 through 4; and
  to use scrambling of subframe number 6 for RBs in the WCE-DRS other than the first set of RBs if the first DRS falls in any of subframe numbers 5 through 9.

19. The apparatus of claim 17, wherein the at least one processor is further configured:
  to use a legacy scrambling rule for RBs in the WCE-DRS other than the first set RBs.

20. The apparatus of claim 19, wherein the at least one processor configured to use the legacy scrambling rule is configured to:
  to use scrambling of subframe number n for RBs of the legacy DRS and scrambling of subframe number n+1 for RBs of the WCE-DRS when the legacy DRS and the WCE-DRS of the multiple subframe CE DRS fall in subframes n and n+1 respectively.

21. A method for wideband coverage enhancement (WCE) in a wireless network, the method comprising:
  receiving, by a UE configured for WCE wireless communications in the wireless network, a multiple subframe coverage enhancement (CE) discovery reference signal (DRS) having both legacy system information block (SIB) message payload and WCE SIB message payload encoded therein, wherein the legacy SIB message payload comprises system information to aid one or more UE operable in the wireless network implementing a non-wideband coverage enhancement communication mode and the WCE SIB message payload comprises system information to aid one or more UE operable in the wireless network implementing a wideband coverage enhancement communication mode;
  determining, by controller logic of the UE, if a location of one or more resources within the multiple subframe CE DRS indicates that the legacy SIB message payload and the WCE SIB message payload are independently encoded in the multiple subframe CE DRS or that the legacy SIB message payload and the WCE SIB message payload are jointly encoded in the multiple subframe CE DRS;
  if it is determined that the location of the one or more resources within the multiple subframe CE DRS indicates that the legacy SIB message payload and the WCE SIB message payload are independently encoded in the multiple subframe CE DRS, decoding, using a receive processor of the UE, the WCE SIB message payload for use by the UE in implementing the wideband coverage enhancement communication mode; and
  if it is determined that the location of the one or more resources within the multiple subframe CE DRS indicates that the legacy SIB message payload and the WCE SIB message payload are jointly encoded in the multiple subframe CE DRS, decoding, using a receive processor of the UE, the legacy SIB message payload and the WCE SIB message payload for use by the UE in implementing the wideband coverage enhancement communication mode.

22. The method of claim 21, wherein the one or more resources comprise an extended physical downlink control channel (ePDCCH).

23. The method of claim 21, wherein the multiple subframe CE DRS comprises a legacy DRS and a WCE-DRS, wherein if the location of the one or more resources within the multiple subframe CE DRS indicates that the legacy SIB message payload and the WCE SIB message payload are independently encoded the legacy SIB message payload is communicated in the legacy DRS and the WCE SIB message payload is communicated in the WCE-DRS, and wherein if the location of the one or more resources within the multiple subframe CE DRS indicates that the legacy SIB message payload and the WCE SIB message payload are jointly encoded the legacy SIB message payload and the WCE SIB message payload are each communicated in both the legacy DRS and the WCE-DRS.

24. The method of claim 23, wherein it is determined that legacy SIB message payload and the WCE SIB message payload are independently encoded if the location of the one or more resources within the multiple subframe CE DRS is in the WCE-DRS.

25. The method of claim 23, wherein it is determined that legacy SIB message payload and the WCE SIB message payload are jointly encoded if the location of the one or more resources within the multiple subframe CE DRS is in the legacy DRS.

26. An apparatus configured for wideband coverage enhancement (WCE) in a wireless network, the apparatus comprising:
  at least one processor; and
  a memory coupled to the processor, wherein the at least one processor is configured:
    to receive, by a UE configured for WCE wireless communications in the wireless network, a multiple subframe coverage enhancement (CE) discovery reference signal (DRS) having both legacy system information block (SIB) message payload and WCE SIB message payload encoded therein, wherein the legacy SIB message payload comprises system information to aid one or more UE operable in the wireless network implementing a non-wideband coverage enhancement communication mode and the WCE SIB message payload comprises system information to aid one or more UE operable in the wireless network implementing a wideband coverage enhancement communication mode;
    to determine, by the UE, if a location of one or more resources within the multiple subframe CE DRS indicates that the legacy SIB message payload and the WCE SIB message payload are independently encoded in the multiple subframe CE DRS or that the legacy SIB message payload and the WCE SIB message payload are jointly encoded in the multiple subframe CE DRS;
    to decode, by the UE, the WCE SIB message payload for use by the UE in implementing the wideband coverage enhancement communication mode if it is determined that the location of the one or more resources within the multiple subframe CE DRS indicates that the legacy SIB message payload and the WCE SIB message payload are independently encoded in the multiple subframe CE DRS; and to decode, by the UE, the legacy SIB message payload and the WCE SIB message payload for use by the UE in implementing the wideband coverage enhancement communication mode if it is determined that the location of the one or more resources within the multiple subframe CE DRS indicates that the legacy SIB message payload and the WCE SIB message payload are jointly encoded in the multiple subframe CE DRS.

27. The apparatus of claim 26, wherein the one or more resources comprise an extended physical downlink control channel (ePDCCH).

28. The apparatus of claim 26, wherein the multiple subframe CE DRS comprises a legacy DRS and a WCE-DRS, wherein if the location of the one or more resources within the multiple subframe CE DRS indicates that the legacy SIB message payload and the WCE SIB message payload are independently encoded the legacy SIB message payload is communicated in the legacy DRS and the WCE SIB message payload is communicated in the WCE-DRS, and wherein if the location of the one or more resources within the multiple subframe CE DRS indicates that the legacy SIB message payload and the WCE SIB message payload are jointly encoded the legacy SIB message payload and the WCE SIB message payload are each communicated in both the legacy DRS and the WCE-DRS.

29. The apparatus of claim 28, wherein it is determined that legacy SIB message payload and the WCE SIB message payload are independently encoded if the location of the one or more resources within the multiple subframe CE DRS is in the WCE-DRS.

30. The apparatus of claim 28, wherein it is determined that legacy SIB message payload and the WCE SIB message payload are jointly encoded if the location of the one or more resources within the multiple subframe CE DRS is in the legacy DRS.

* * * * *